(12) United States Patent
Doerfel

(10) Patent No.: US 6,208,938 B1
(45) Date of Patent: Mar. 27, 2001

(54) APPARATUS AND METHOD FOR MONITORING AND REPORTING WEATHER CONDITIONS

(75) Inventor: Steve Doerfel, Lawton, OK (US)

(73) Assignee: Cambridge Management Advanced Systems Corporation, Lawton, OK (US)

(*) Notice: Subject to any disclaimer, the term of this patent is extended or adjusted under 35 U.S.C. 154(b) by 0 days.

(21) Appl. No.: 09/609,054

(22) Filed: Jun. 30, 2000

Related U.S. Application Data

(63) Continuation of application No. 08/934,073, filed on Sep. 19, 1997, now Pat. No. 6,085,152.

(51) Int. Cl.$^7$ .................................................. G06F 169/00
(52) U.S. Cl. ............................................................. 702/3
(58) Field of Search .............................. 702/3, 4; 356/221, 356/222, 435; 348/139, 135; 340/904, 945, 601, 602; 73/170.16, 170.17, 170.27

(56) References Cited

U.S. PATENT DOCUMENTS

| | | | |
|---|---|---|---|
| 3,694,936 | 10/1972 | Ling et al. | 356/208 |
| 3,985,452 | 10/1976 | Bylander et al. | 356/201 |
| 4,086,616 | 4/1978 | Catano et al. | 358/81 |
| 4,216,498 | * 8/1980 | Evans et al. | 348/135 |
| 4,225,245 | 9/1980 | Roiret et al. | 356/437 |
| 4,311,388 | 1/1982 | Roiret et al. | 356/341 |

(List continued on next page.)

OTHER PUBLICATIONS

Publication entitled "Automated Visiblility & Cloud Cover Measurements with a Solid–State Imaging System," R.W. Johnson, W.S. Hering and J.E. Shields of University of California at San Diego, Scripps Institution of Oceanography, Marine Physical Laboratory (Mar. 1989) (SIO Ref. 89–7, MPL–U–26/89).

Publication entitled "An Automated Observing System for Passive Evaluation of Cloud Cover and Visibility," J.E. Shields, R.W. Johnson and M.E. Karr of University of California at San Diego, Marine Physical Laboratory (Jul. 1992) (SIO red. 92–22, MPL–U–65/92).

* cited by examiner

*Primary Examiner*—Donald E. McElheny, Jr.
(74) *Attorney, Agent, or Firm*—Laurence J. Marhoefer; Venable

(57) ABSTRACT

A weather monitoring, measuring and reporting system which uses unattended, high-resolution digital cameras and laser rangers to both measure and display weather conditions in a local region, such as the region surrounding an airport. Visibility is estimated by processing images in the camera's field of view at known range distances. The light response of the camera is matched to the light response of the human eye. In a preferred embodiment of the invention, the camera generates a digital pixel image of range objects; that is, prominent terrain objects such as, buildings, water towers, etc. in the camera's field of view. The digital pixel values of these range objects are stored in system memory at known address locations. The contrast between an average background pixel value in a region adjacent to an object and the average object pixel value is used to determine if the object is visible. Objects in the field of view are sequentially examined until the contrast to an object falls below the established threshold at which point the visibility is reported as extending to the next closest object with a contrast above the threshold. If the contrast for all objects exceeds the threshold, the process stops and the visibility range is reported as unlimited.

1 Claim, 6 Drawing Sheets

U.S. PATENT DOCUMENTS

| | | | |
|---|---|---|---|
| 4,419,731 | 12/1983 | Puffett | 364/428 |
| 4,444,530 | 4/1984 | van Kempen | 405/303 |
| 4,520,360 | 5/1985 | Schwab | 340/947 |
| 4,789,894 | 12/1988 | Cooper | 358/105 |
| 4,943,854 | 7/1990 | Shiota et al. | 358/108 |
| 4,958,306 | 9/1990 | Powell et al. | 364/550 |
| 4,989,084 | 1/1991 | Wetzel | 358/108 |
| 5,042,922 | 8/1991 | Pepper | 359/72 |
| 5,090,795 | 2/1992 | O'Meara et al. | 359/240 |
| 5,206,698 | 4/1993 | Werner et al. | 356/5 |
| 5,289,275 | 2/1994 | Ishii et al. | 348/154 |
| 5,434,778 | 7/1995 | Nylander | 364/420 |
| 5,438,360 | 8/1995 | Edwards | 348/208 |
| 5,513,854 | 5/1996 | Daver | 273/454 |
| 5,517,236 | 5/1996 | Sergeant et al. | 348/143 |
| 5,521,634 | 5/1996 | McGary | 348/169 |
| 5,592,151 | 1/1997 | Rolih | 340/584 |
| 5,592,157 * | 1/1997 | Metz et al. | 340/905 |

KEY:

LBRG

[/] BACKGROUND PIXEL IN REGION ADJACENT RANGE OBJECT

LTAR

[X] RANGE OBJECT PIXELS

APPARATUS AND METHOD FOR MONITORING AND REPORTING WEATHER CONDITIONS

CROSS REFERENCE TO RELATED APPLICATION

This application is a continuation of application Ser. No. 08/934,073, filed Sep. 19, 1997, now U.S. Pat. No. 6,085,152.

BACKGROUND OF THE INVENTION

1. Field of the Invention

This invention relates to an improved method and apparatus for monitoring and reporting weather conditions in a defined region, for example, airport visibility and ceiling conditions. More particularly, it relates to a method and apparatus which provides accurate, representative, and timely condition and surveillance reports without the need for human intervention. This invention has particular application to the monitoring and reporting of airport weather, and will be explained in that context here. However it will be appreciated that the invention is generally applicable to monitoring and reporting visibility, cloud ceiling, and related weather conditions generally in a defined region.

2. Description of the Prior Art

The ability of the human eye to see objects through the atmosphere is limited by the presence of airborne particles, such as moisture, ice, sand, dust, and the like. Both reflective loss and absorptive loss can cause a reduction in visibility. Reflective losses are a function of scatter coefficients and absorptive losses are a function of extinction coefficients. There have been a number of proposals in the prior art for estimating visibility, usually in a context of airport visibility. In general, these prior art systems, including the FAA's Automated Surface Observation System (ASOS), measure the transmission of a light source through the atmosphere. This approach is generally limited to sampling only small areas and extrapolating a visibility report for a larger region on the basis of these samples.

The FAA requires accurate visual weather observation of climatic conditions affecting flight operations at thousands of airfields within the National Airspace System (NAS) Systems like the Automated Surface Observation System (ASOS) report wind, ceiling, barometric pressure, dew point, and existing temperature within overall geographic areas to FAA Flight Service stations and other users. These systems, however, often do not provide the current and accurate visibility and cloud height conditions that determine the arrival/departure envelope of a specific airport's active runway(s) especially during operationally significant weather changes. To meet this requirement within the NAS today, contract observation personnel report on airport specific visibility, ceiling, and weather condition changes.

The use of contract observers is costly, and their natural attrition requires continuous training of new observers—with associated delays in filling vacancies. ASOS data is non-representative when weather is rapidly changing, which not only poses a problem in and of itself, but also creates a need for contract observers to compensate for this non-representative condition report. Finally, the unique demands of remote airfields and their lack of timely information pose a severe problem for these locations.

SUMMARY OF THE INVENTION

An object of this invention is the provision of a digital imaging and laser ranging system to monitor and report regional visibility, cloud height, and ceiling without the need for human observers.

Briefly, this invention contemplates the provision of a weather monitoring, measuring and reporting system which uses unattended, high-resolution digital cameras and laser rangers to both measure and display weather conditions in a local region, such as the region surrounding an airport. Visibility is estimated by processing images in the camera's field of view at known range distances. The light response of the camera is matched to the light response of the human eye. In a preferred embodiment of the invention, the camera generates a digital pixel image of range objects; that is, prominent terrain objects such as, buildings, water towers, etc. in the camera's field of view. The digital pixel values of these range objects are stored in system memory at known address locations. The contrast between an average background pixel value in a region adjacent to an object and the average object pixel value is used to determine if the object is visible. For example, with a contrast threshold of 5%, if the contrast for an object exceeds 5% visibility is considered as extending at least to the range of that object. Objects in the field of view are sequentially examined until the contrast to an object falls below the established threshold (e.g. 5%) at which point the visibility is reported as extending to the next closest object with a contrast above the threshold. If the contrast for all objects exceeds the threshold, the process stops and the visibility range is reported as unlimited.

Cloud height and ceiling are determined with a pulse laser/receiving system or LIDAR system which takes cloud height measurements equally displaced throughout the hemisphere or dome which envelops the region. These measurements are processed using standard FAA approved algorithms to calculate a ceiling value. In addition, a camera forms a digital image of the cloud cover where the laser cloud height measurement is made and this image can be displayed along with the cloud height data.

In one specific embodiment, three cameras and a laser range finder are attached to a platform, which is mounted on a two axis gimbal. A platform control system rotates the platform through 360° in azimuth and 90° in elevation and precisely positions the platform in azimuth so that objects used for visibility determination are precisely aligned in successive frames of the same objects. One camera is used for determining visibility, one for imaging daylight cloud cover and daylight surface surveillance, and one infrared responsive camera for imaging nighttime cloud cover and night surface surveillance.

Here it should be noted that the camera assigned for daylight surface and cloud cover observation and the IR camera may be used advantageously in combination for surveillance and cloud cover observation at all times, i.e. during daylight and conditions of reduced ambient light (e.g. nighttime). The images from the two cameras may be toggled back and forth in the simplest system. In another system, images from the two cameras may be combined at the pixel level, providing a generally uniform pictorial view of surface and/or cloud cover in all ambient light conditions.

In making visibility measurements, the platform is rotated to points whose separation depends upon the camera's angular field of view. For example, with a 15° field of view, the platform stops every 15°. Obviously, cameras with a field of view larger or smaller than 15° can be used. At each point, a visibility range is determined for that sector and the data is stored. The reported visibility is in accordance with the Federal Meteorological Handbook (FMH) to "FAA Order 7900SA, Surface Weather Observing—METAR";

that is, the furthest distance at which known landmarks are visible around at least half the horizon. The stored information is updated with each rotation of the platform and a new visibility range calculated. A user interface allows the user to easily select and display weather data and cloud images for any selected sector and elevations above the horizon. The user may be close to the system but typically is at a remote location.

In one implementation, a distributed, networked set of semi-autonomous airfield data collection systems support database server sites, which collectively operate as a central depository for surface weather observation information. A typical airfield installation is composed of a sensor positioning unit with its installed sensors, a data collection and communications control computer, and an environmental management module. The airfield weather observation data and related imagery is transmitted electronically to remote users. The system offers the flexibility of processing the data and imagery at the airfield before transmission to the remote sites or processing after receipt of the data at the remote site. In all cases, the focus of the system is to deliver timely, accurate, and representative surface weather observation information of visibility, cloud height, cloud ceiling, cloud type, and amount of cloud cover. Users of the surface weather observation information and related imagery stored in the system may access it via computer workstations connected to the database servers by local area networks or remote communications links, including satellites and the Internet.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT

Figure 1:
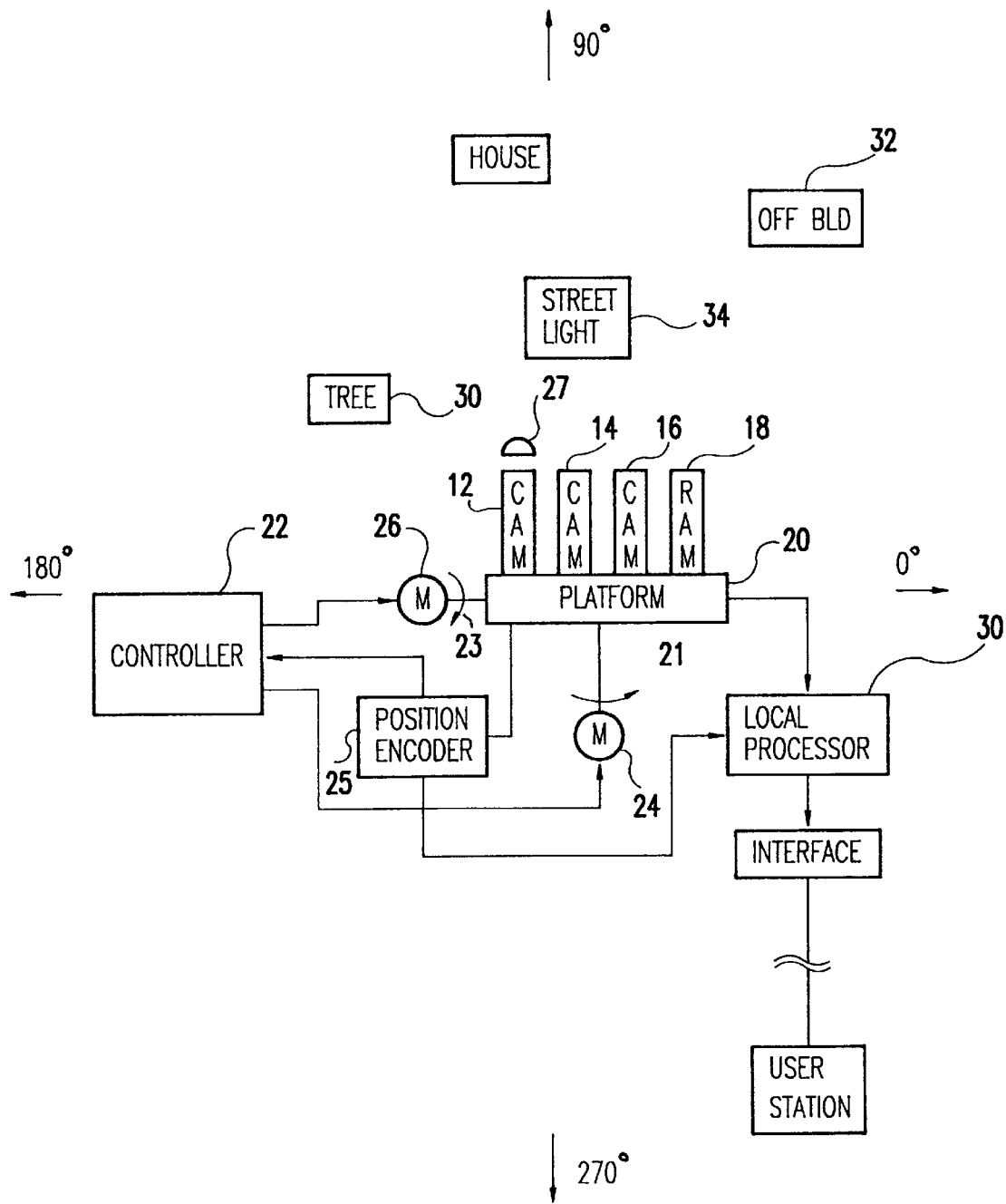
FIG. 1 is a functional block diagram of one embodiment of a weather monitoring, measuring and reporting system in accordance with the teachings of this invention.
Figure 2:
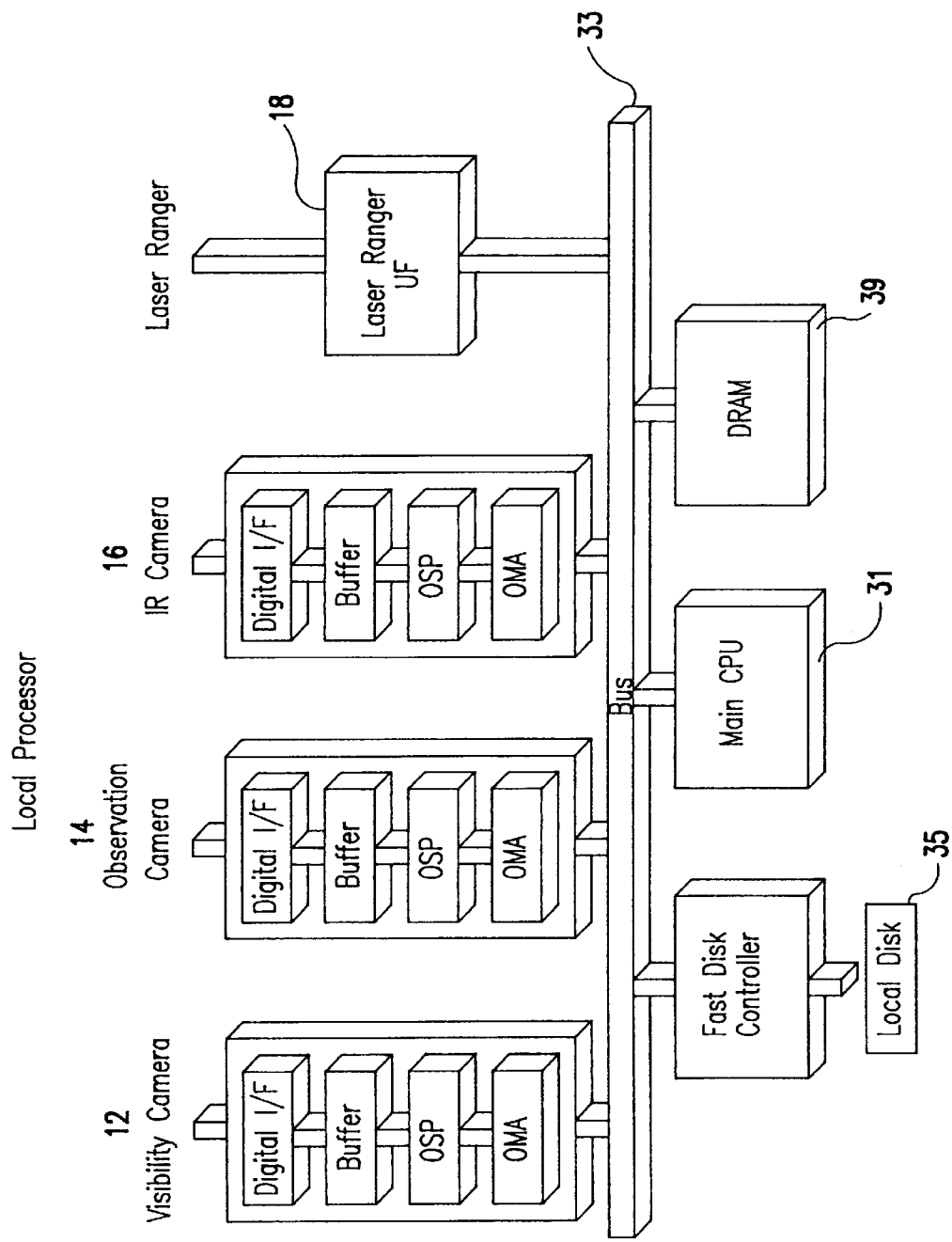
FIG. 2 is a functional block diagram of the local processor shown in FIG. 1.

Referring now to FIGS. 1 and 2, in this preferred embodiment of the invention, a digital visibility camera 12, an observation camera 14, an infrared camera 16, and a laser range finder 18 are mounted on a platform 20, which is gimbal mounted for 360° rotation about a vertical axis 21 and 90° horizontal axis 23. The platform and its associated electronics are enclosed in a weather tight and environmentally controlled enclosure (not shown) with a window through which the cameras and laser range finder are pointed. A servo motor 24 rotates the platform about the vertical axis and a servo motor 26 rotates the platform about the horizontal axis 23. Preferably closed loop servo systems with platform position encoder 25 are used to precisely point the platform in a sequence of selected directions in response to inputs from a controller 22. Each camera, in this exemplary embodiment, has a field view or approximately 15°. Obviously, cameras with larger or smaller fields of view can be used. For example, in determining visibility, controller 22 (e.g. a programmed logic controller or a controller which receives position commands from the local processor) in combination with motor 24, rotates the platform through 360° in the horizontal plane stopping at 15° intervals. At each point the system processor 30 calculates the visibility. A communications interface 33 couples the local processor 30 to a user work station 37 via a communication network such as a leased telephone line.

The cameras 12, 14, and 16 are preferably high resolution digital cameras, such as for example the Kodak Megaplus Model ES 1.0 Progressive Scan, 1024×1024 pixel CCD, high resolution camera. As shown in FIG. 2, the local processor 30 includes a main processor 31 connected by a bus 33 to each of the cameras and the laser ranger, a local disk storage 35 and a high-speed access memory 39. Each camera has a digital I/F, a buffer memory, a digital signal processor, and a direct memory access DMA stage to pre-process the pixel data, which is stored on the local disk 35 and/or the RAM 39.

Digital camera 12, used in determining visibility, has a filter 27 to match the photopic spectral response of the camera to the light response of the human eye. Suitable optical filters are also commercially available to match the response of the camera 12 to the response of the human eye.

As will be appreciated by those skilled in the art, in determining airport visibility, the range of interest may extend from a few feet to ten miles or more. With the system of this invention, existing landmarks, such as, buildings 32, water towers 34, RF antenna 36, etc. may be used as range determining objects either alone or in combination with range objects positioned especially to implement the system. Some targets are used in daylight only, other, lighted targets, at night, and still others (e.g. office buildings) can be used in both high ambient light and low ambient light. It will be appreciated that the ability to determine visibility at long distances without the need for special targets is very advantageous.

The process of "seeing" the landmarks is based on an analysis of the contrast in the scene. Contrast is the difference between gray shades in an observed object, with the difference between pure black and pure white being maximal contrast. Basically, in the presence of increasing haze, fog, or anything which reduces contrast, the ability to discern the more finely-detailed features of an object will be lost first. Then, as the density of the haze or fog increases (i.e., as the visibility decreases), the ability to discriminate more coarsely detailed features will decline. The system uses the contrast between a landmark at a known point and its background to determine visibility in a manner similar to that of a human observer.

A suitable visibility camera 12 has the following exemplary features:

| | |
|---|---|
| Total FOV: | 15° × 360° (achieved using a 15° × 15° optic rotated around the horizon to get 360°) |
| Spectral Response | 400–700 nm (achieved by a filter) |
| Resolution: | 1 arc minute (achieved by matching high-resolution detector array with an appropriate optic) |
| Dynamic Range: | 200 dB (characteristic of the detector array) |

The camera uses a grayscale readout (e.g. 10 bit grayscale) rather than a color readout because the technique used in the system is contrast determination, which is not color-dependent.

A digital camera rather than analog is used. First, the resolution is much better than with analog cameras. The system preserves the digital integrity of the signal throughout the signal-handling process. The digital detector array is not subject to "blooming" in the presence of small, bright lights such as aircraft landing lights. Such lights tend to wash out the entire image in an analog camera, but in the case of the digital camera, only the small set of detectors that are actually directly aligned with the offending source will saturate. Neighboring detectors will work normally. Finally, the fact that digital cameras are used permits the use of high-speed image processing.

The Kodak ES1.0 camera is suitable for this application because it provides all the capabilities required for determining visibility.

For each sector (in this example a 15° sector), processor 31 commands camera 12 to generate a digital pixel image of the sector. Processor 31 maps the digital data stream from camera 12 into a memory 42 so that the pixels of range landmarks occupy known address positions. Here one skilled in the art will appreciate the need for the platform to precisely point the camera in making visibility measurements or, in the alternative, electronically compensate for any frame to frame misalignment. The point at which the platform 20 is directing the cameras is coupled as an input to the processor 31. Disk 35 also stores previously loaded data relating to each range object in each sector. In one example, the data identifies memory addresses associated with a range object, the addresses of the background region for that range object, and the range to that object.

Figure 3:
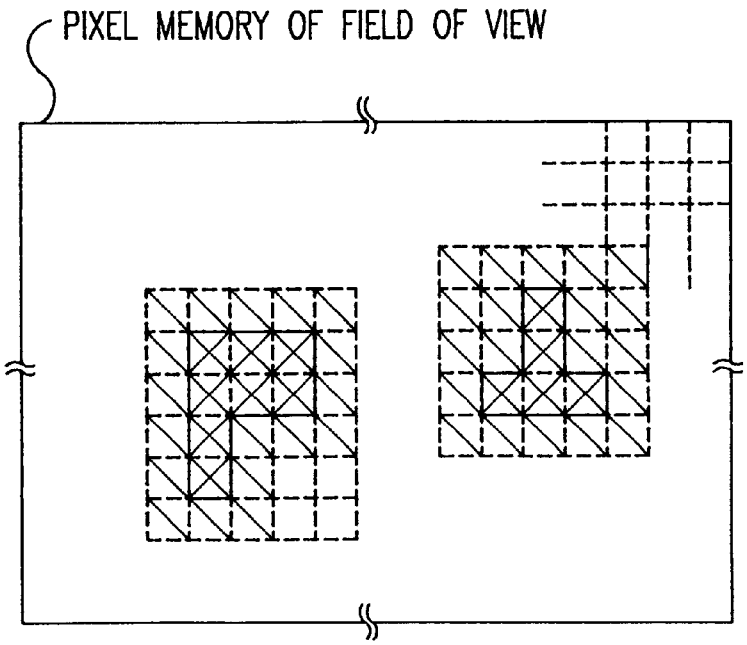
FIG. 3 is a pictorial representation or pixel locations in memory of a portion of object image.

Referring now also to FIG. 3, the processor 31 fetches from memory 35 the pixel values for one range object in the field of view, which pixel values have been mapped to known address locations. The processor 31 also fetches background pixel values in the region around the range object, which have also been mapped to known address locations in memory 35. The processor 31 contrasts the average of the pixel values in the background with the average in the object. This comparison contrasts the brightness of the object to its background. If the contrast between the background and object exceeds a threshold (e.g. 5%) the processor stores the range to the range object as visible. If the contrast does not exceed the threshold, the range to the object is reported as not visible. That is, the contrast "C" is computed as equal to the average pixel value in the region of interest "LTAR" minus the average of pixel values in the background region "LBKG" divided by the sum of LTAR and LBKG (C=(LTAR−LBRG)/(LTAR+LBRG)).

An alternative method of determining visibility from the pixel image of the range objects is to compare it with a pixel image of the object itself which represents the pixel values of the range object when, for example, the visibility is judged unlimited. The pixels may be compared to a threshold to determine if the range object is "visible."

As the above process is repeated in fifteen-degree increments around the entire horizon, a visibility observation cycle report is generated. This report consists of a set of images organized by direction around the compass at these fifteen-degree intervals. Also included is a local visibility value for each. The final airfield visibility value is determined from these according to the FAA Order i.e., visibility is the furthest distance at which known landmarks are visible around at least half of the horizon. This airfield visibility value is added to the METAR formatted report. Like all weather observation functions, this cycle is repeated at a predetermined reporting frequency, which is nominally five minutes.

Figure 4:
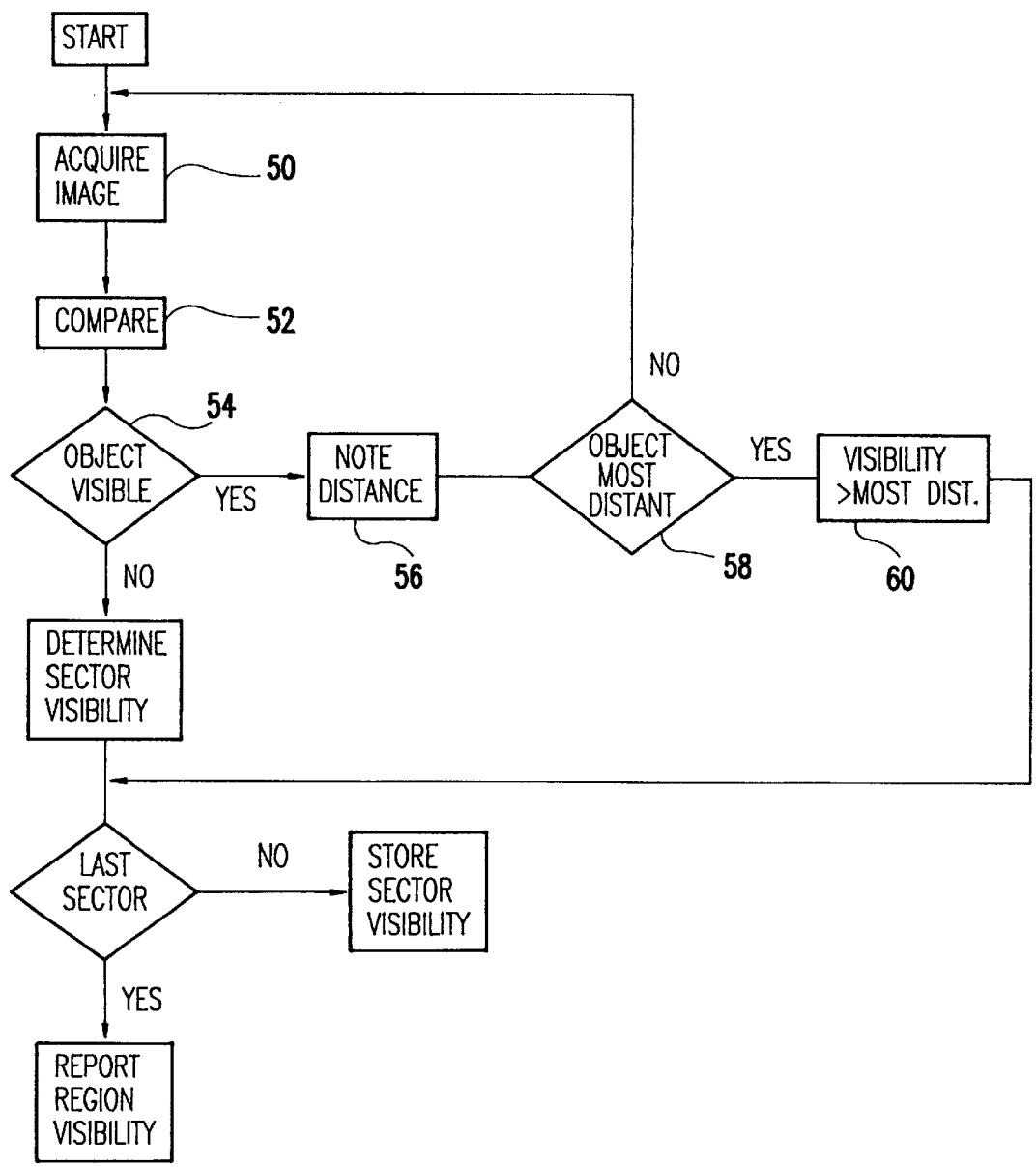
FIG. 4 is a flow diagram of the processor steps in determining visibility.

FIG. 4 is a flow diagram of the program steps in determining the visibility range. In step 50, a pixel image of the sector is generated by camera 12 and stored in memory 35. In this program, the range objects are taken in an order starting with the closest object and moving in a sequence of increasing range to the furthest object. In block 52, the average pixel values of the background and target object are compared. If the contrast exceeds a threshold value, in decision 54 the range to the object is noted, block 56. In decision block 58 a determination is made if the range noted in block 54 is the most distant range object. If it is not, the process is repeated until either the comparison in block 52 determines the object is not visible, or the most distant object is determined to be visible, block 60. If the range object is not visible, program block 64 stores a sector visibility range equal to the range to the previous visible range object. If the result of decision block 58 is that the most distant range object is visible, program block 60 stores visibility as greater than the most distant object.

Figure 5:
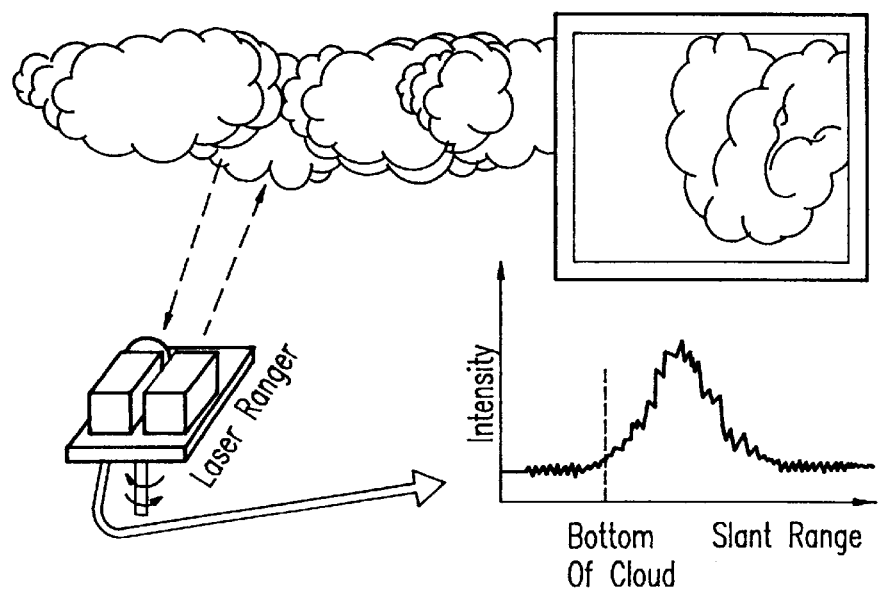
FIG. 5 is a pictorial diagram illustrating cloud, height and ceiling measurement and a pictorial view of cloud type and amount.

Cloud height and ceiling measurement consists of both alphanumeric results and imagery. The alphanumeric result is obtained using an eye-safe laser ranging device 18 (laser ranger) to provide cloud height samples over the airfield's celestial complete dome. Referring to FIG. 5, the laser ranger 18 sends out a series of laser pulses and detects the times and intensities (amplitudes) of the reflected return pulses from the cloud. The time elapsed from a pulse emission to its return is directly proportional to cloud's slant range. The system accurately estimates the location of the bottom of the cloud by detecting the slope change in the intensity of the return pulses as a function of time. Suitable laser rangers for cloud height and ceiling measurement are commercially available. Having sampled cloud heights around the done, the system calculates a value for the ceiling. Concurrently, the system images the clouds simultaneously, in the IR spectra and in the visible spectra, to permit cloud type determination.

Using the correct number of cloud height samples is important to producing a ceiling measurement which is truly representative of conditions in an airfield's operating area. The more samples available, the more representative the report will be. On the other hand, collecting samples takes time—about one second each. Because the system is fully programmable, it has the option of trading the number of cloud height samples per report against latency, or time between reports. A methodology that uses 127 samples is a good compromise. These 127 samples are enough to detect any significant clouds around the dome, yet not so many that our reports are delayed long enough for the weather to change significantly.

Using the proper spatial distribution of cloud height samples is equally important. The sample distribution must be uniform around the dome, rather then concentrated in a particular area. The system achieves this by decreasing the number of samples per azimuth rotation, as the elevation angle is incrementally increased, as shown in FIG. 6.

Figure 6:
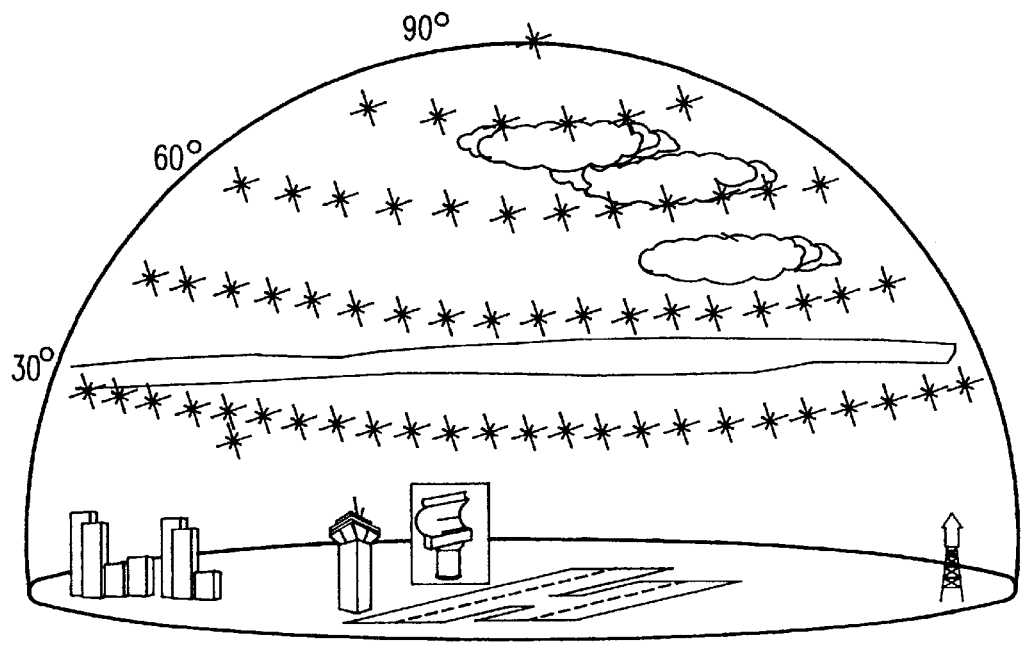
FIG. 6 is a pictorial representation illustrating the distribution of cloud height measurements in accordance with the invention.
Figure 7:
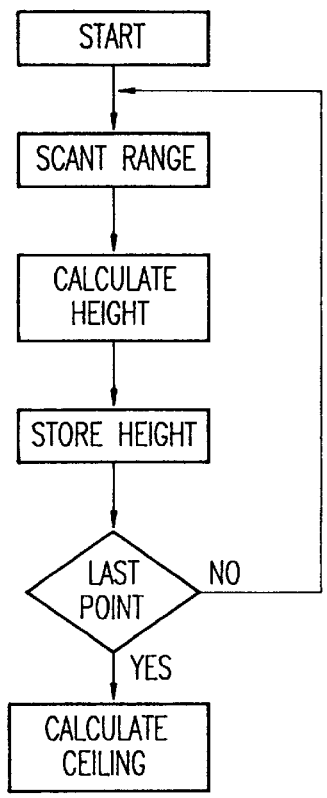
FIG. 7 is a flow diagram of the processor steps in determining ceiling.

Referring now to FIG. 6, in accordance with the teaching of this invention, cloud height measurements are made so that they are distributed substantially uniformly throughout the entire hemispherical area over the platform. Here it will be appreciated to provide uniformly distributed samples, more samples are needed at low elevation angles than at high elevation angles. FIG. 6 illustrates the hemisphere with a series of concentric circles. In one specific embodiment, the platform controller 22 positions the platform 20 to take a total of 127 cloud height measurements in each cycle of platform rotation through 360°. In this example, a minimum elevation (e.g. 15°), a total thirty-six cloud height measurements are made; one every ten degrees. At an elevation angle 30° and thirty measurements are made; one every 12 degrees, and so on for each increment in laser beam elevation until a single measurement is made with the laser pointing straight up (90° in elevation). FIG. 7 is a flow diagram of these process steps.

For cloud height, the system simply converts slant range to height above ground level ($h_{AGL}$). This is a matter of solving a trigonometric equation, given the slant range to the cloud ($r_s$) and the angle ($\emptyset$) between that range vector and the ground plane (incremental elevation). It is simply:

$$h_{AGL} = r_s \cdot \sin(\emptyset)$$

"Ceiling" is reported as "clear," "scattered," "broken," or "overcast" depending on the percentage of cloud cover per FMH rules. The system determines ceiling by computing statistics for the set of cloud height measurements. The system determines the percentage of samples where it received a return of sufficient density to indicate a cloud. The rest is assumed to be open sky. Next, a Ceiling Observation Cycle report is constructed. This report combines direction, cloud height data, and imagery into the same convenient reporting format as the visibility observation report. In this case, the imagery is provided by the observation camera 14 for daytime operations, and by the IR camera at night. Hence, a visual image of the sky conditions at any aspect angle is always available, day or night so cloud type can be determined by user. This is provided, along with numerical cloud height and ceiling results, to the local workstation where it is displayed.

It is also possible to pick a reference altitude and make a more definitive statement about cloud coverage at that altitude. For example, the system could use the new ASOS maximum altitude goal of 24,000 feet, and distribute samples uniformly at that altitude rather than around the dome. This results in a cylindrical coverage volume, rather than a hemispherical one.

Preferably, at each point where the laser ranger 18 makes a cloud height measurement, either the camera 14 or the camera 16, depending upon ambient light conditions, generates a pixel image of the cloud cover in the direction the platform is pointing when the measurement is made; i.e. along the line of sight of the laser ranger. The camera 14 is used for daylight images and the infrared sensitive camera 16 is used for generating images in conditions of reduced ambient light and/or reduced visibility. Ambient light can be determined by averaging the pixel values in an entire frame and comparing the result to a threshold value. Alternatively, both cameras can be used in all conditions of ambient light. The pixel images are stored on disk 35 and are selectively displayed in response to user inputs via the graphical user interface 41. It will be appreciated, using cloud height measurements evenly distributed throughout the hemispherical region of interest provides a more representative estimate of cloud ceiling. Combining this improved ceiling information with visual images of the actual cloud cover gives a user reliable information as to local weather conditions, particularly where those weather conditions are changing.

In addition to providing cloud cover images, the cameras 14 and 16 can also provide images for ground surveillance. To provide ground surveillance images, the platform controller 22 moves platform 20 so that the camera's field of view includes a portion of the surface of interest, such as a runway or could be moved through any angle desired, including 360°. Again the images are stored, and can be selectively displayed in response to user inputs via a graphical user interface. If desired, the system can be programmed to slew, in response to user commands, the platform directly to one or more predetermined positions for an immediate visual update of conditions on the ground.

The observation camera 14 can image better than the naked eye in the presence of atmospheric haze and also gives a marginal improvement in the case of fog and darkness. A haze filter is used to block some of the blue wavelengths in the visible spectrum and at the same time the camera makes use of some of the intrinsic near infrared (NIR) sensitivity of the detector. It has a sensitivity ranging from 550 to about 1000 nm. This proves to be especially beneficial because the intrinsic scattering of the atmosphere, on a molecular level, is dominated by the blue wavelengths. With the addition of atmospheric haze due to high humidity conditions, blue scattering increases. The result is that the amount of energy coming to the detectors will be dominated by radiation scattered into the detector's optical path from the atmosphere itself, rather than directly from the cloud. The net effect is that there is a loss of contrast and resolution. Applying a filter with a cutoff wavelength of about 550 nm, midway through the visible spectrum, significantly reduces this component of the detector signal.

Adding the NIR capability of the detector does two things. First, it increases the signal in a spectral region where interpretation by an observer using a monitor will still be a familiar task. Additionally, because of water vapor absorption bands in the NIR, the aerosol scattering characteristics of the cloud and the omission of the blue wavelengths, it enhances the contrast for surveillance and cloud cover imaging. There is a significant amount of what is termed Rayleigh scattering near a cloud, as well, and this contributor to the signal is also reduced. The result is that the loss of color information provided by an instrument such as the eye is partially compensated for by both the filtering of the visible spectrum and the addition of the NIR.

The observation camera is sensitive to the NIR wavelengths. Thus, the camera offers a degree of night-vision capability, since it can make use of an extended region of the spectrum where many light sources used around an airport have a significant signal. Since this region of the spectrum is adjacent to the visible range, the same type lens may be used over this entire spectral region with a minimal loss of image quality.

The IR camera provides enhanced capability at night by imaging the heat sources present, which includes all objects in the FOV. It was designed to be rugged and intrinsically simple to operate. It will operate over a wide temperature range and, since it is completely sealed, is resistant to humidity changes. The uncooled technology used in the detector array minimizes power consumption, reduces packaging costs, and eliminates moving parts. The frame configuration is 320×240 pixels. Resolvable temperature differences of less than a degree are achieved. Because of the range of temperatures present in and around clouds, very good images are acquired.

Figure 8:
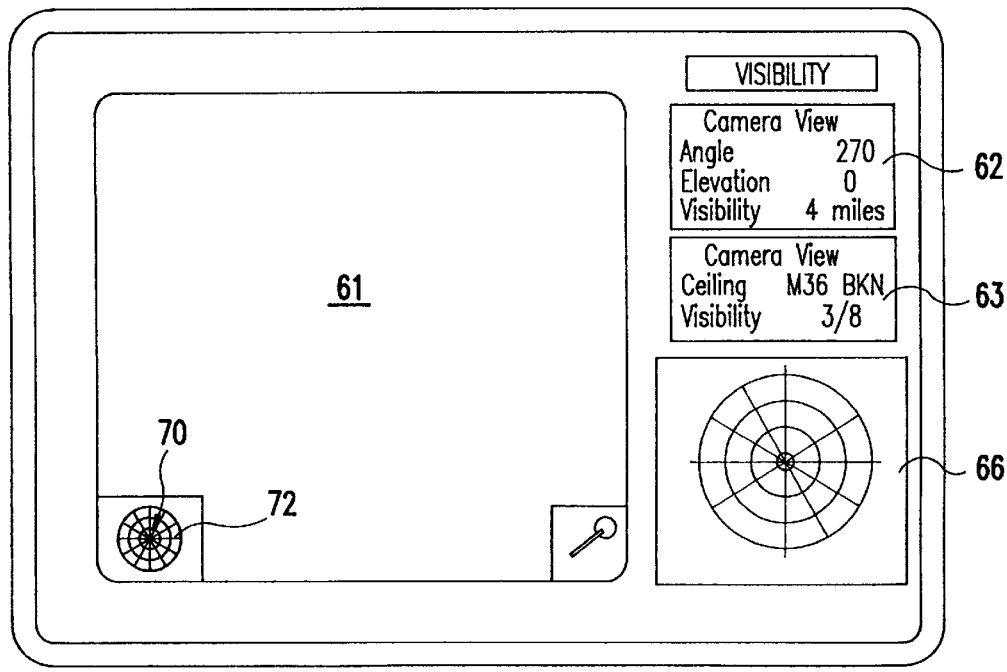
FIG. 8 is a pictorial view of a workstation with its graphical user interface.

FIG. 8 illustrates a graphical user interface and display for the system. In this preferred embodiment, the display screen displays a pictorial image 61 of the cloud cover or ground under surveillance. A current view data box 62, tells the user the camera azimuth and elevation at which the displayed pictorial image was taken, along with the cloud height at that azimuth and elevation. A current weather box 63 displays the ceiling and visibility calculations along with the time at which those calculations were made. A user interface 66, which resembles a spider web, allows the use conveniently to select an azimuth angle and elevation he or she wishes to be displayed. The radial lines represent the points on a compass and the concentric rings represent elevation angles, increasing in elevation from the outer ring toward the center. A desired angle and elevation may be selected by placing a mouse cursor in the desired segment and clicking. The shaded portion 70 of spider web icon 72 represents graphically the angle and elevation the image on the display screen 61.

In a typical system, a complete cycle of the system making and reporting visibility, cloud, and surveillance observations will take about five minutes. However, in certain situations, in response to a user input, for example, the system could be commanded to execute a cycle of visibility only measurements and report. For example, this would take less time, on the order of one minute. In addition, the system could be commanded to slew directly to a given point in order to make an immediate observation, for example, a surface surveillance observation.

While the invention has been described in terms of a single preferred embodiment, those skilled in the art will recognize that the invention can be practiced with modification within the spirit and scope of the appended claims.

I claim:

1. A method for determining and displaying weather conditions, including the steps of:

generating a pixel image in a sector of the compass that includes a plurality of objects each at respectively different known range distances;

calculating a contrast value between an average of pixel values in at least a portion of the pixel image of a first one of said plurality of objects and an average of pixel values of a background image adjacent said pixel image of the first one of said plurality of objects; and comparing said contrast value to a threshold value to determine if it is less than or if it is greater than the threshold value in order to determine whether or not visibility extends to the range of said object;

repeating said calculating and said comparing steps until the range to the furthest visible object is determined;

making a plurality of cloud height measurements throughout a hemispherical region;

calculating a ceiling value from said plurality of cloud height measurements;

making a plurality of digital images of cloud cover substantially contemporaneously with the step of making of a plurality of cloud height measurements;

storing said plurality of digital images;

displaying said ceiling value; and displaying selected ones of said plurality of digital images.

\* \* \* \* \*